(12) United States Patent
Kotera et al.

(10) Patent No.: US 8,749,492 B2
(45) Date of Patent: Jun. 10, 2014

(54) DISPLAY DEVICE EQUIPPED WITH A TOUCH PANEL

(75) Inventors: Masamichi Kotera, Saitama (JP);
Kouichiro Takashima, Tokyo (JP);
Hideki Sato, Miyagi (JP); Minoru Nakano, Kanagawa (JP)

(73) Assignee: Sony Corporation (JP)

( * ) Notice: Subject to any disclaimer, the term of this patent is extended or adjusted under 35 U.S.C. 154(b) by 773 days.

(21) Appl. No.: 11/805,253

(22) Filed: May 22, 2007

(65) Prior Publication Data

US 2008/0007538 A1 Jan. 10, 2008

(30) Foreign Application Priority Data

May 24, 2006 (JP) ................. P2006-144331

(51) Int. Cl.
*G06F 3/041* (2006.01)
(52) U.S. Cl.
USPC ............................. 345/173; 361/520; 349/58
(58) Field of Classification Search
USPC .............. 345/173, 87–104; 349/179–181, 58; 361/520
See application file for complete search history.

(56) References Cited

U.S. PATENT DOCUMENTS

| | | | | |
|---|---|---|---|---|
| 4,279,021 A * | 7/1981 | See et al. | ...................... | 708/131 |
| 4,944,577 A * | 7/1990 | Yoshida et al. | ................ | 349/179 |
| 4,958,148 A * | 9/1990 | Olson | ............................ | 345/174 |
| 5,093,985 A * | 3/1992 | Houldsworth et al. | ......... | 29/830 |
| 5,278,362 A * | 1/1994 | Ohashi | .......................... | 200/5 A |
| 5,583,678 A * | 12/1996 | Nishino et al. | ................. | 349/118 |
| 5,907,375 A * | 5/1999 | Nishikawa et al. | ............. | 349/12 |
| 5,920,301 A * | 7/1999 | Sakamoto et al. | .............. | 345/96 |
| 6,154,210 A * | 11/2000 | Anderson | ...................... | 715/840 |
| 6,167,469 A * | 12/2000 | Safai et al. | ...................... | 710/62 |
| 6,259,491 B1 * | 7/2001 | Ekedahl et al. | ................. | 349/23 |
| 6,370,282 B1 * | 4/2002 | Pavley et al. | .................. | 382/311 |
| 6,380,497 B1 * | 4/2002 | Hashimoto et al. | ........... | 200/5 A |
| 6,462,938 B1 * | 10/2002 | Horne et al. | ............. | 361/679.28 |

(Continued)

FOREIGN PATENT DOCUMENTS

| | | |
|---|---|---|
| JP | 55-006994 U | 1/1980 |
| JP | 63-164127 U | 10/1988 |

(Continued)

OTHER PUBLICATIONS

Japanese Office Action issued on Nov. 14, 2008 in connection with corresponding Japanese Appln. No. 2006-144331.

(Continued)

*Primary Examiner* — Dorothy Harris
(74) *Attorney, Agent, or Firm* — Lerner, David, Littenberg, Krumholz & Mentlik, LLP

(57) ABSTRACT

A display device equipped with a touch panel may include a device chassis provided with an opening section, a display panel having a display surface disposed accessible through the opening section, a touch panel disposed on the display surface of the display panel and capable at least of selecting a function displayed on the display surface in response to a pressing operation on the touch panel, and a surface sheet for covering the touch panel on the opposite side to the display panel, and closing the opening section to form a substantially the same surface with the device chassis, wherein a reinforcing area for improving resistivity against pressing force applied from the outside may be provided in a predetermined range of the surface sheet.

16 Claims, 6 Drawing Sheets

(56) References Cited

U.S. PATENT DOCUMENTS

| | | | |
|---|---|---|---|
| 6,529,188 B1* | 3/2003 | Suzuki | 345/173 |
| 6,559,908 B2* | 5/2003 | Hiratsuka et al. | 349/58 |
| 6,664,950 B1* | 12/2003 | Blanchard | 345/173 |
| 6,677,664 B2* | 1/2004 | Inoue et al. | 257/668 |
| 6,721,019 B2* | 4/2004 | Kono et al. | 349/12 |
| 6,734,926 B2* | 5/2004 | Fan et al. | 349/58 |
| 6,995,976 B2* | 2/2006 | Richardson | 345/173 |
| 7,087,308 B2* | 8/2006 | Sakurada et al. | 428/432 |
| 7,554,624 B2* | 6/2009 | Kusuda et al. | 349/58 |
| 2001/0033009 A1* | 10/2001 | Inoue et al. | 257/668 |
| 2001/0038493 A1* | 11/2001 | Watanabe et al. | 359/609 |
| 2002/0000979 A1* | 1/2002 | Furuhashi et al. | 345/173 |
| 2003/0058225 A1* | 3/2003 | Kusuda et al. | 345/173 |
| 2003/0185554 A1* | 10/2003 | Nakano et al. | 396/235 |
| 2004/0017364 A1* | 1/2004 | Tanaka et al. | 345/173 |
| 2004/0080683 A1* | 4/2004 | Mai | 349/58 |
| 2004/0201752 A1* | 10/2004 | Parulski et al. | 348/231.99 |
| 2004/0246400 A1* | 12/2004 | Yeom | 349/58 |
| 2005/0213924 A1* | 9/2005 | Sakurai et al. | 385/147 |
| 2005/0285991 A1* | 12/2005 | Yamazaki | 349/58 |
| 2006/0098392 A1* | 5/2006 | Sakurai | 361/520 |
| 2006/0109355 A1* | 5/2006 | Yoon | 348/240.99 |
| 2007/0181456 A1* | 8/2007 | Kusuda et al. | 206/443 |
| 2007/0218957 A1* | 9/2007 | Nishikawa et al. | 455/566 |
| 2008/0278457 A1* | 11/2008 | Sugamoto et al. | 345/173 |
| 2009/0073370 A1* | 3/2009 | Kondo et al. | 349/150 |

FOREIGN PATENT DOCUMENTS

| | | | |
|---|---|---|---|
| JP | 06-11540 A | | 2/1994 |
| JP | 6-102488 A | | 4/1994 |
| JP | 09-185102 A | | 7/1997 |
| JP | 10-073805 A | | 3/1998 |
| JP | 2000-222128 A | | 8/2000 |
| JP | 2000-249596 A | | 9/2000 |
| JP | 2001-102763 A | | 4/2001 |
| JP | 3078557 U | | 4/2001 |
| JP | 2001-154802 A | | 6/2001 |
| JP | 2003-043450 A | | 2/2003 |
| JP | 2003-140558 A | | 5/2003 |
| JP | 2003195300 A | * | 7/2003 |
| JP | 2005-317409 A | | 11/2005 |
| JP | 2006-011163 A | | 1/2006 |
| WO | WO 2005064451 A1 | * | 7/2005 |

OTHER PUBLICATIONS

Sony Corporation: "Sony Cyber-Shoot DSC—N1 User's Guide / Troubleshooting", Jan. 1, 2005, pp. 1-132, XP 055051675. Retrieved from the Internet: >URL:http://www.sony.jp/cyber-shot/emdown/data/N1_trouble.pdf.

European Search Report from EP Application No. 07108675, dated Feb. 6, 2013.

* cited by examiner ent to the display device. Accordingly, the breakage of the transparent electrode might otherwise caused by the concentrated stress can be prevented, and in this regard as well, the display device with high reliability can be provided.

DISPLAY DEVICE EQUIPPED WITH A TOUCH PANEL

CROSS-REFERENCE TO RELATED APPLICATIONS

This application claims priority from Japanese Patent Application No. JP 2006-144331 filed in the Japanese Patent Office on May 24, 2006, the entire content of which is incorporated herein by reference.

BACKGROUND OF THE INVENTION

1. Technical Field

The present invention relates to a display device equipped with a touch panel, the display device allowing input operations using a display surface of a display panel by disposing a touch panel on the display surface of the display panel accessible through an opening section of a device housing.

2. Related Art

As a display device equipped with a touch panel of this kind in the related art, there is cited what is described in JP-A-10-73805 (hereinafter referred to as "Patent Document 1"), for example. Patent Document 1 describes what is related to a liquid crystal display device equipped with a liquid crystal panel integrated with a touch panel. The liquid crystal device described in Patent Document 1 is characterized in that "in the liquid crystal display device having a liquid crystal display panel with a transparent touch panel stacked on the display surface side thereof housed in a case with a display window, the case is made support only the touch panel, and the back face of the liquid crystal display panel is made a predetermined length distant from the inside surface of the case."

According to the liquid crystal display device having such a configuration described in Patent Document 1, an advantage that "the pressing force can be prevented from acting on the liquid crystal display panel in the floating state, and accordingly, the variation in display caused by the pressing force can be prevented from appearing in the liquid crystal display panel (see paragraph [0010])" is expected.

The touch panel provided to the liquid crystal display device described in Patent Document 1 is a so-called resistive-film touch panel having a pair of film substrates each provided with a transparent electrode on the surface facing each other and a spacer intervening between the pair of film substrates. The resistive-film touch panel is arranged so that the transparent electrode of the film substrate touches the transparent electrode of the film substrate in response to the film substrate being pressed, thus the position of the pressed area is detected to perform an input operation. FIG. 7 shows an example of the display device of the related art equipped with such a resistive-film touch panel.

The display device 100 shown in FIG. 7 is composed of a device chassis 101 provided with an opening section 101a, a display panel 102 housed inside the device chassis 101 and having a display surface accessible through the opening section 101a, a touch panel 103 disposed in the display surface of the display panel, a seal member 104 intervening between the touch panel 103 and the device chassis 101, and so on. Further, the touch panel 103, which is of the resistive-film, is composed of an upper substrate 103a and a lower substrate 103b each provided with a transparent conductive film (corresponding to the transparent electrode of the touch panel according to Patent Document 1) on the surface thereof facing each other, bar-like cushion members 103c disposed between the peripheries of the upper substrate 103a and the lower substrate 103b, and so on.

In such a touch panel 103, a pressing operation performed on a peripheral area X of the cushion member 103c will cause strong force applied on the upper substrate 103a taking a corner of the cushion member 103c as the fulcrum. In this case, since the transparent conductive film provided to the upper substrate 103a is brittle in nature, if the distance from the point on which the pressing operation is performed to the corner of the cushion member 103c is short, the transparent conductive film might be broken. Therefore, in the display device 100 of the related art, by covering the area X with the rim of the opening section 101a of the device chassis 101, the pressing operation on the area X has been prevented.

However, in the display device having such a configuration, since the area X, which might be broken by the pressing operation thereon is covered with the rim of the opening section 101a of the device chassis 101, a step has been caused between the surface of the device main body 101 and the surface of the touch panel 103. Therefore, the display device easily gets dirty with foreign particles such as dust accumulated in the step section between the device chassis 101 and the touch panel 103, resulting in problems of a cumbersome work for removing the dirt and of a low visual quality of the appearance thereof, from the view point of design.

SUMMARY OF THE INVENTION

Therefore, it is desirable to solve the problem that by covering the peripheral section of the touch panel where the transparent electrode might be broken by the pressing operation with the rim of the opening provided to the device chassis, the step is caused between the surface of the device chassis and the surface of the touch panel resulting in the dirtiness with the foreign particles such as dust accumulated in the step section and the low visual quality of the whole device.

According to an embodiment of the present invention, there is provided a display device equipped with a touch panel, which may include a device chassis provided with an opening section, a display panel having a display surface disposed accessible through the opening section, a touch panel disposed on the display surface of the display panel and capable at least of selecting a function displayed on the display surface in response to a pressing operation on the touch panel, and a surface sheet for covering the touch panel on the opposite side to the display panel, and closing the opening section to form a substantially same surface with the device chassis, wherein a reinforcing area for improving resistance against pressing force applied from the outside may be provided in a predetermined range of the surface sheet.

According to the display device equipped with a touch panel of the embodiment of the invention, by providing the surface sheet for covering the touch panel disposed on the display panel and for closing the opening section of the device chassis to form a part of the device chassis, one surface of the device chassis through which the display panel provided with the touch panel is accessible may be made planar. As a result, dirtiness with the foreign particles such as dust accumulated in one surface of the device chassis can be prevented, and the visual quality of the whole device can be improved. Moreover, by providing the reinforcing area with improved resistance against the pressing force applied from the outside in the surface sheet, the concentrated stress can be prevented from locally acting on the touch panel covered with the reinforcing area, thus the breakage of the transparent conductive film of the touch panel can be prevented.

BRIEF DESCRIPTION OF THE DRAWINGS

FIG. 4 is a cross-sectional explanatory view of the digital still camera shown in FIG. 1 showing the states of the touch panel, the surface sheet, and so on.

DETAILED DESCRIPTION

A display device equipped with a touch panel, which can improve the visual quality of the whole device by forming an opening section of a device chassis, which the touch panel is stacked on a display panel accessibly through, as a plane without a step, and can prevent breakage of a transparent conductive film of the touch panel, is realized with a simple configuration.

Figure 1:
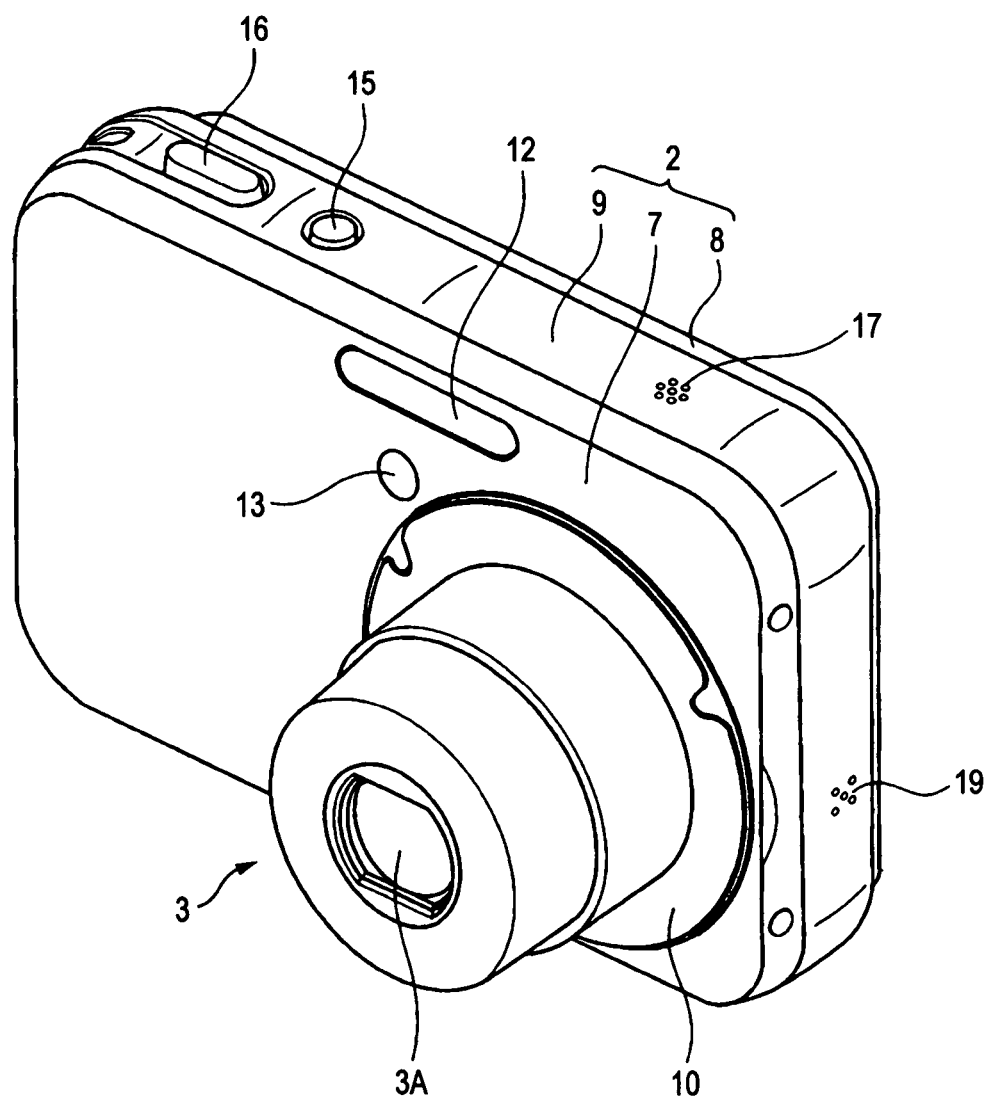
FIG. 1 is a perspective view from the front side of a digital still camera (an imaging apparatus) showing a first embodiment of the display device equipped with a touch panel according to the invention.
Figure 2:
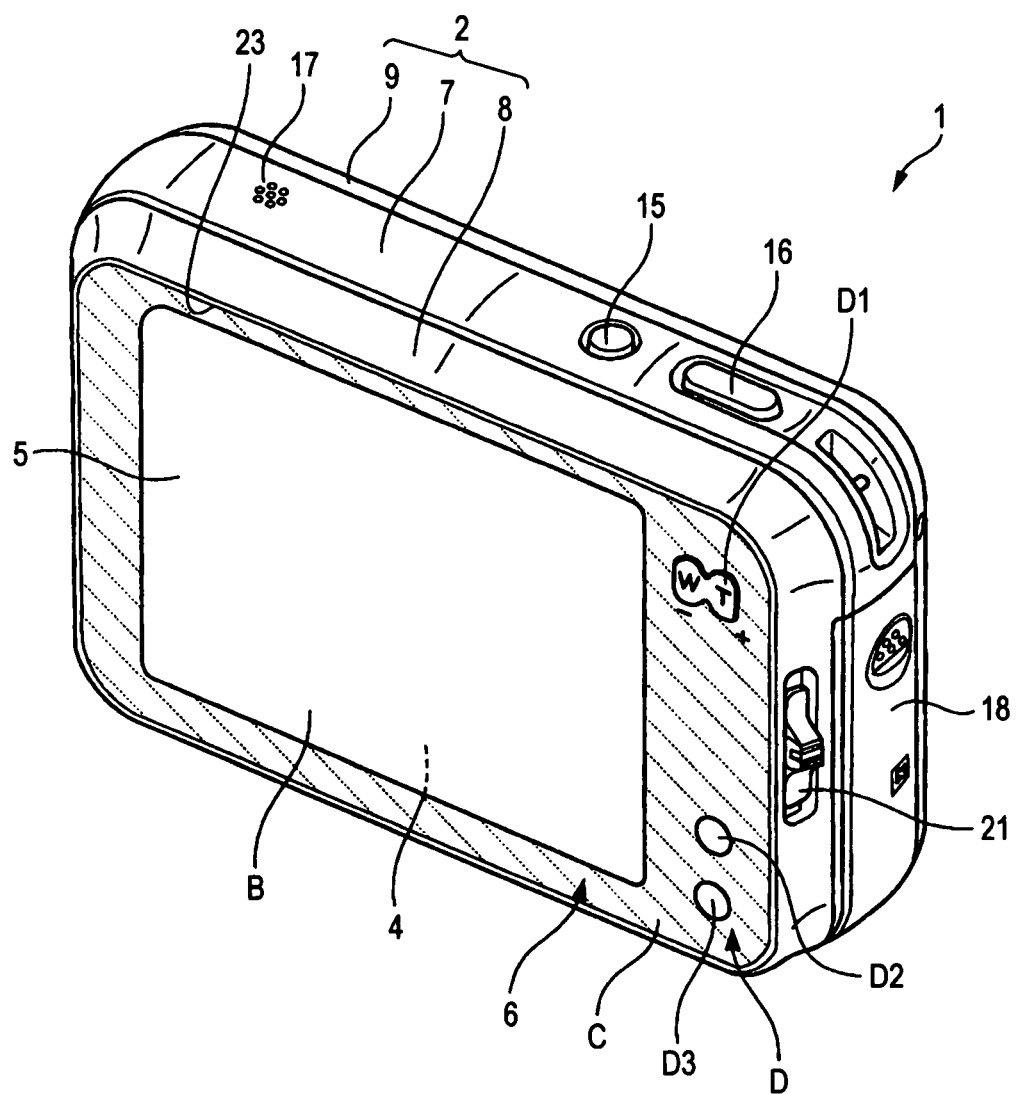
FIG. 2 is a perspective view from the rear side of the digital still camera (the imaging apparatus) showing the first embodiment of the display device equipped with a touch panel according to the invention.
Figure 3:
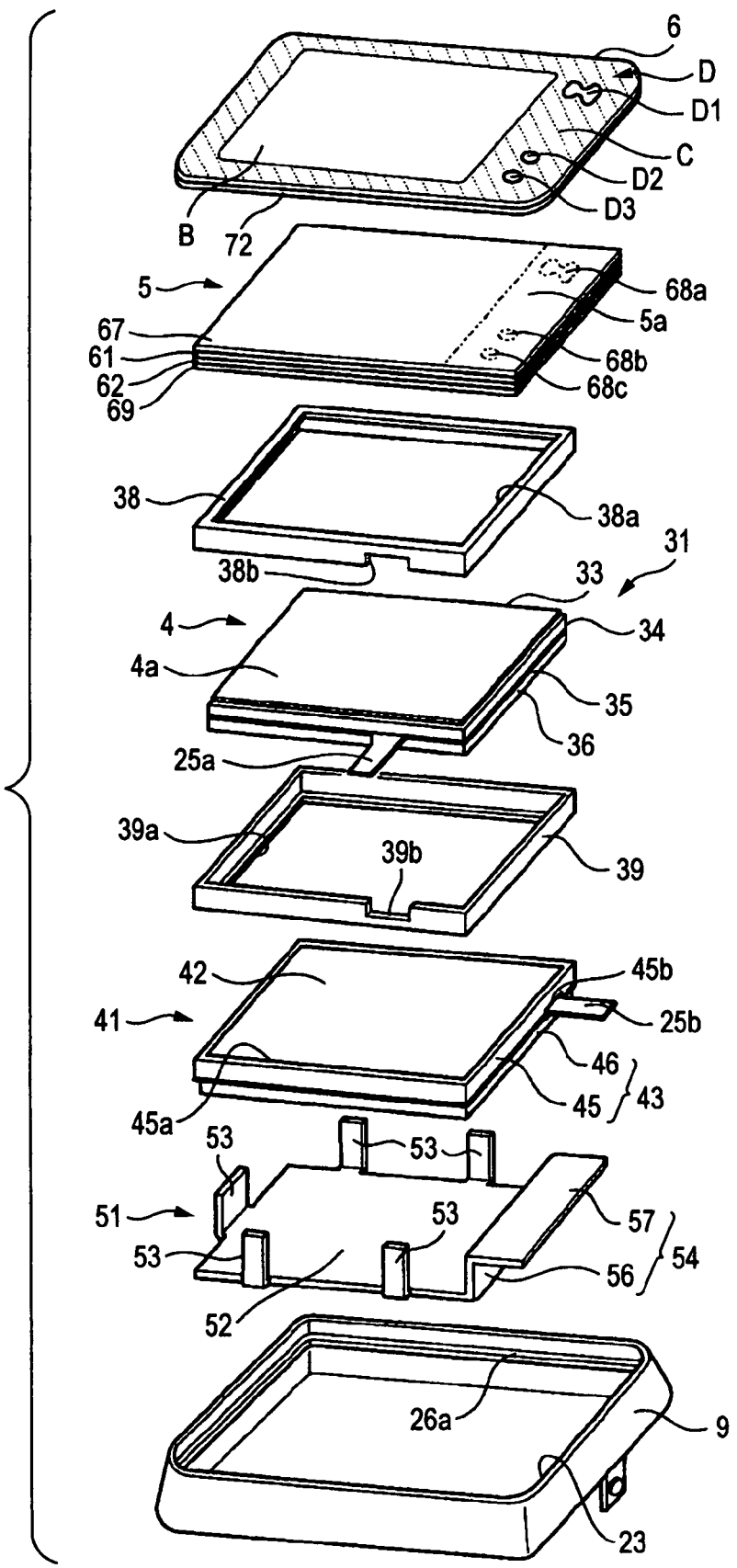
FIG. 3 is an exploded explanatory view separating a touch panel, a surface sheet, and so on from the digital still camera.
Figure 4:
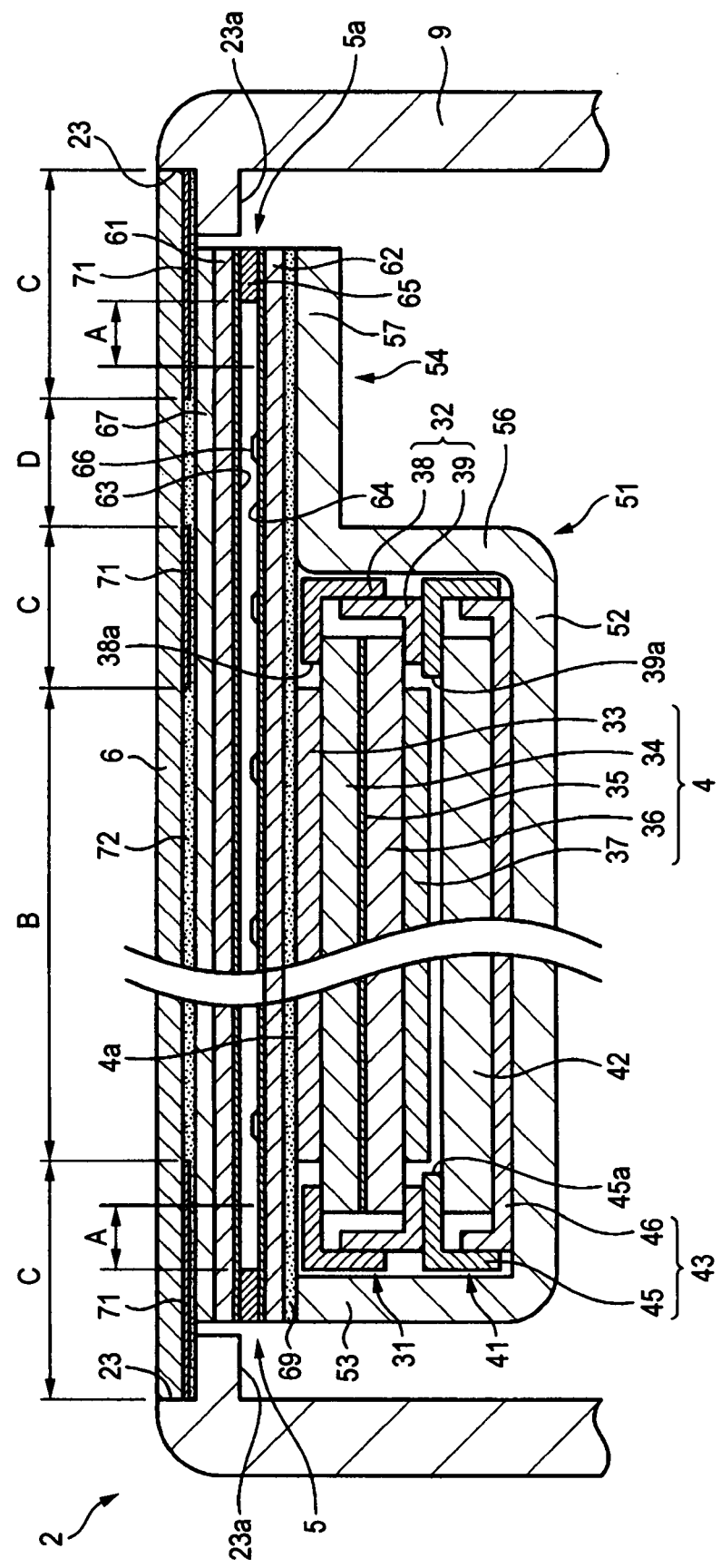
Figure 5:
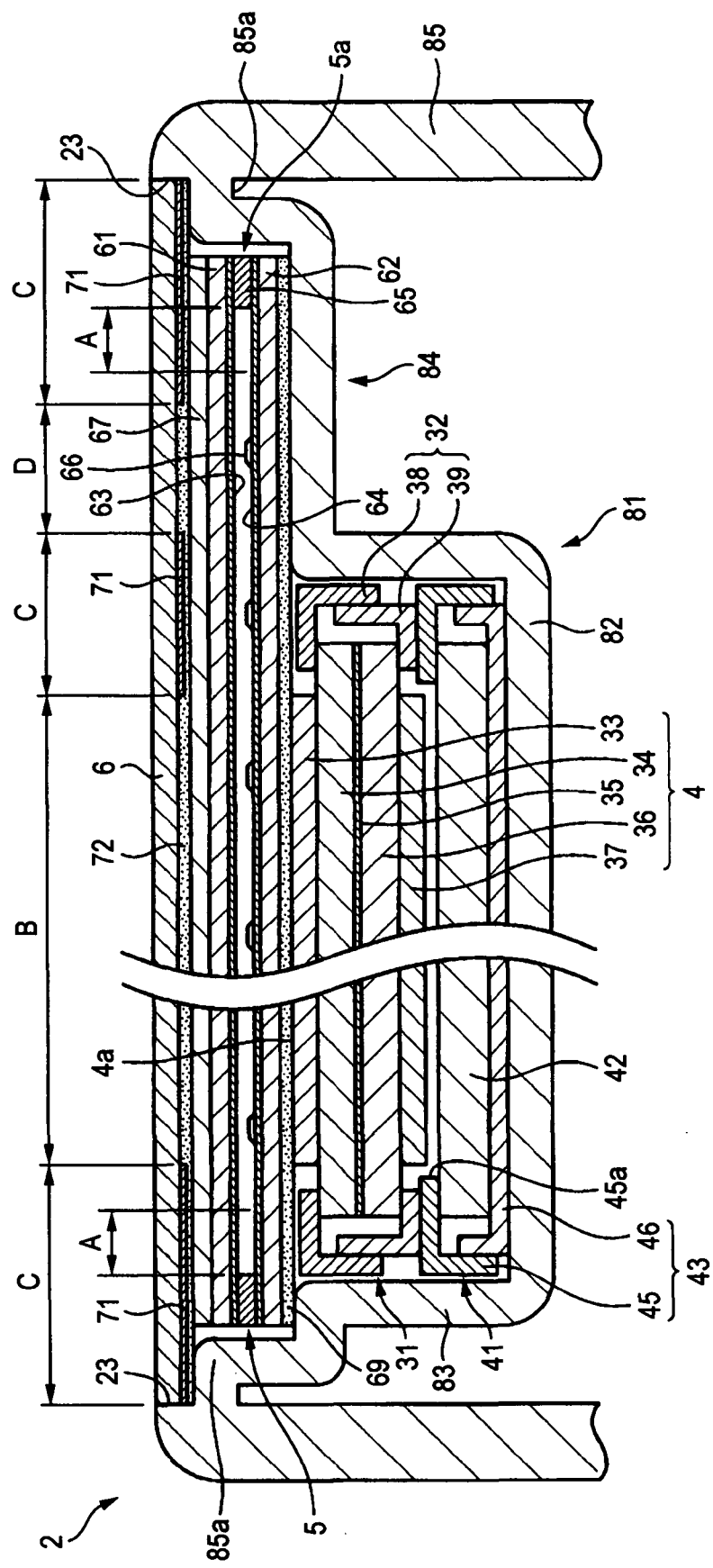
FIG. 5 is a cross-sectional explanatory view for explaining a digital still camera (an imaging apparatus) showing a second embodiment of the display device equipped with a touch panel according to the invention.
Figure 6:
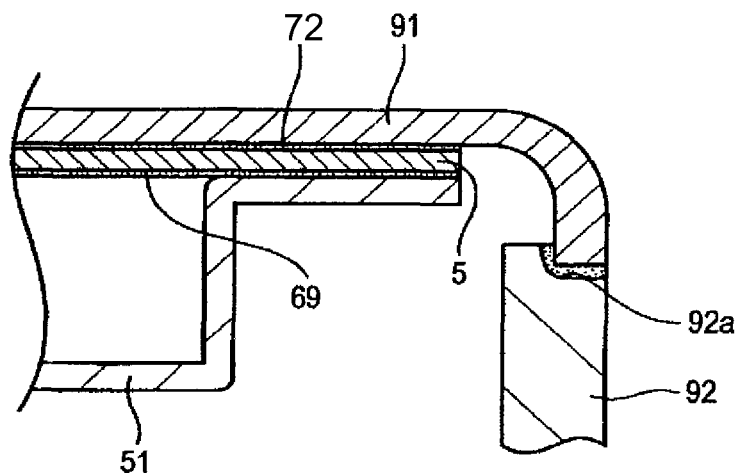
FIG. 6 is a cross-sectional explanatory view for explaining a digital still camera (an imaging apparatus) showing a third embodiment of the display device equipped with a touch panel according to the invention.
Figure 7:
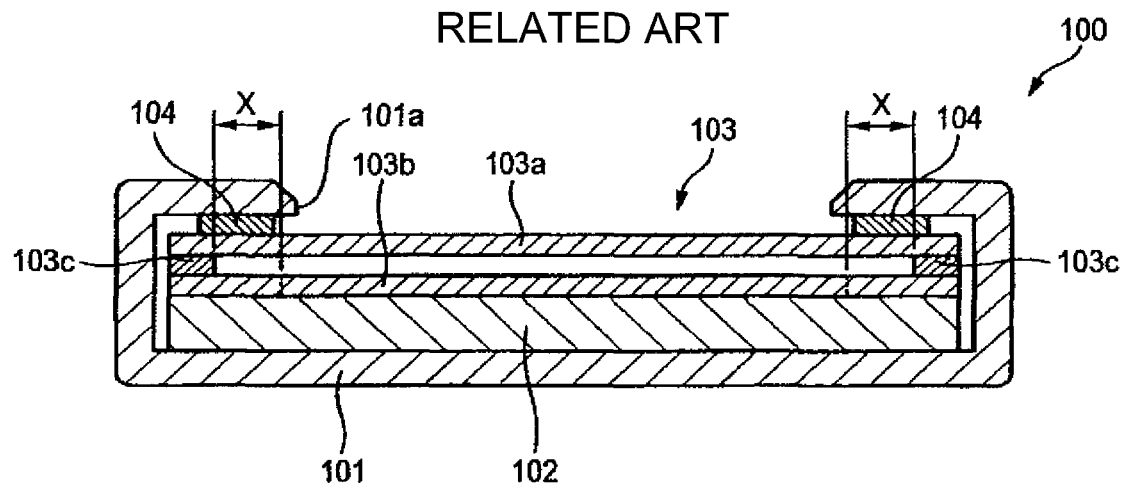
FIG. 7 is a cross-sectional explanatory view showing a display device equipped with a touch panel according to the related art.

FIGS. 1 through 6 are for explaining the embodiments of the invention. Specifically, FIG. 1 is a perspective view from the front side of a digital still camera showing a first embodiment of the display device equipped with a touch panel according to the invention, FIG. 2 is a perspective view from the rear side of the digital still camera shown in FIG. 1, FIG. 3 is an exploded explanatory view separating a touch panel, a surface sheet, and so on from the digital still camera shown in FIG. 1, FIG. 4 is a cross-sectional explanatory view of the digital still camera shown in FIG. 1 showing the states of the touch panel, the surface sheet, and so on, FIG. 5 is a cross-sectional explanatory view for explaining a second embodiment of the display device equipped with a touch panel according to the invention, and FIG. 6 is a cross-sectional explanatory view for explaining a third embodiment of the display device equipped with a touch panel according to the invention.

FIGS. 1 and 2 show a digital still camera 1 applied as the first embodiment of an imaging apparatus showing a specific example of a display device equipped with a touch panel according to the invention. The digital still camera 1 is arranged to use a semiconductor recording medium as an information recording medium, and to be able to convert an optical image from the subject into an electric signal using imaging means such as CCD (a solid-state imaging device) to record it on the semiconductor recording medium, or to display it on a display panel such as a liquid crystal display.

The digital still camera 1 is configured including a camera case 2 showing a specific example of a device chassis, a lens body tube 3 for acquiring an image of the subject as light and leading the light to an imaging device such as CCD or CMOS as imaging means, a liquid crystal panel 4 showing a specific example of a display panel for displaying an image in accordance with a video signal output from the imaging device, a touch panel 5 disposed on a display surface of the liquid crystal panel 4 and capable of selecting a function, which is displayed on the display surface of the liquid crystal panel 4, in response to a pressing operation thereon, a surface sheet 6 for covering a surface of the touch panel 5 opposite to the liquid crystal panel 4, a control device for controlling an operation of the lens body tube 3, display of the liquid crystal panel 4, and so on, a battery power supply not shown, and so on.

The camera case 2 is composed of a front case 9 and a rear case 8 each formed of an elongated flat vessel and overlapped each other in an anteroposterior direction, a center case 7 formed of a substantially rectangular frame intervening between the front case 9 and the rear case 8, and so on. Inside the camera case 2, there is housed a control device for driving and controlling the lens body tube 3, the liquid crystal panel 4, and so on. The control device is composed of, for example, a wiring board on which a predetermined electric circuit is formed by a printing formation method or the like, electronic components such as a microcomputer, resistors, or capacitors mounted at predetermined positions on the wiring board, and so on.

A decorative ring 10 is attached to the front case 7 on the front surface at a position a little bit shifted from the center thereof, and the lens body tube 3 is provided movably in a back and forth direction through a center hole of the decorative ring 10. The lens body tube 3 is a so-called retractable lens which has a configuration capable of expanding and contracting in a nested manner, and is retracted inside the camera case 2 when shooting is not performed. It is arranged that the front surface of the lens body tube 3 in a field lens 3A side forms substantially the same plane with the front surface of the front case 7 when the lens body tube 3 is retracted.

The front case 7 is provided with a light emitting section 12 of a flash unit and a light emitting/receiving section 13 of an automatic focus mechanism at obliquely upward positions of the lens body tube 3. Further, on the upper surface of the center case 9, there are provided a power button 15, a shutter release button 16, sound collecting holes 17 of a sound collecting device such as a microphone, and so on. Further, on one side surface of the center case 9, there is provided a battery storage section for detachably storing a battery as a power source, and the battery storage section is provided with a battery lid 18 detachably attached thereto. Further, on the opposite side section of the center case 9 to the battery lid 18, there are provided speaker holes 19 for a speaker unit.

On a side section of the rear case 8 in the width direction, there is provided a mode selection switch 21 for selecting a functional mode (e.g., a still image mode, a movie mode, or a play back mode). Further, as shown in FIGS. 3 and 4, an opening section 23 is provided to the rear case 8 so as to open a substantially entire area of the rear face of the camera case 2. In the inside of the camera case 2 accessible through the opening section 23, there are provided a liquid crystal panel assembly 31 having the liquid crystal panel 4, a backlight assembly 41 disposed behind the liquid crystal panel assembly 31, a support member 51 for supporting the backlight assembly 41 and the liquid crystal panel assembly 31, and the touch panel 5 disposed and stacked on a display surface 4a of the liquid crystal panel 4. Further, on the opposite side of the touch panel 5 to the liquid crystal panel 4, there is provided the surface sheet 6 for covering the touch panel 5 and at the same time sealing the opening section 23.

The liquid crystal panel assembly 31 is composed of the liquid crystal panel 4, a panel frame 32 for holding the liquid crystal panel 4, and so on. The liquid crystal panel 4 has a elongated rectangular plane shape, and is composed of an upper polarization plate 33, an upper glass plate 34, a liquid crystal layer 35, a lower glass plate 36, and a lower polarization plate 37 stacked in this order from the side of the opening section 23 of the rear case 8. The upper polarization plate 33 and the lower polarization plate 37 of the liquid crystal panel 4 are for aligning the vibration of light passing therethrough to one direction to control the light intensity. The upper and lower polarization plates 33, 37 are arranged to be smaller than the upper and lower glass plates 34, 36 and are disposed through openings 38a, 39a of the panel frame 32 described later, respectively. Further, the surface of the upper polarization plate 33 forms the display surface 4a of the liquid crystal panel 4.

The panel frame 32 is formed of a combination of an outer frame 38 discretely formed as a separated member and an inner frame 39 formed to be a little bit smaller than the outer frame 38. Specifically, the outer frame 38 and the inner frame 39 are formed of rectangular frames having rectangular opening sections 38a, 39a with sizes corresponding to the upper and lower polarization plates 33, 37, respectively, and the panel frame 32 is composed integrally by combining the inside edge of the outer frame 38 and the outside edge 39 of the inner frame 39.

The both inside edges of the shorter sides of the outer frame 38 are each provided with an engaging protrusion not shown, and the both outside edges of the shorter sides of the inner frame 39 are each provided with an engaging recess to be engaged with the corresponding engaging protrusion of the outer frame 38. The engaging protrusions and the engaging recesses are arranged to be respectively engaged with each other when the inside edge of the outer frame 38 and the outside edge of the inner frame 39 are overlapped each other, thus the outer frame 38 and the inner frame 39 are reliably fixed to each other and configured integrally.

As shown in FIG. 3, on one side face of the longer sides of the outer frame 38, there is provided a notch 38b opening downward. Further, on one side face of the inner frame 39 opposing to the one side face of the outer frame 38, there is provided a notch 39b opening upward corresponding to the notch 38b of the outer frame 38. The notches 38b, 39b form a through hole on the side face of the panel frame 32 assembled integrally with the outer frame 38 and the inner frame 39. Further, the through hole of the panel frame 32 is provided with a flexible wiring board 25a connected therethrough to the liquid crystal panel 4.

Although in the present embodiment the configuration of providing the engaging protrusions on the inside edge of the outer frame 38, and providing the engaging recesses on the outside edge of the inner frame 39 is adopted, it is obvious that a reversed configuration of providing the engaging recesses on the inside edge of the outer frame 38, and providing the engaging protrusions on the outside edge of the inner frame 39 can also be adopted. Further, the panel frame 32 can also be integrally configured by fixing the outer frame 38 and the inner frame 39 with fixing means such as a plurality of fixing screws or an adhesive.

The backlight assembly 41 is composed of a backlight main body 42, a light frame 43 for holding the backlight main body 42, and so on. The backlight main body 42 is light source means for supplying the liquid crystal panel 4 with light, and has a plane shape with substantially the same size as the liquid crystal panel 4. As the backlight main body 42, for example, a so-called light emitting diode (LED) backlight using a white LED as the light source, a so-called electroluminescence (EL) backlight using an EL light emitter as the light source, and so on can be cited.

Similarly to the panel frame 32, the light frame 43 is composed of a combination of an outer frame 45 discretely formed as a separated member and an inner frame 46 formed to be a little bit smaller than the outer frame 45, and the size is arranged to be substantially the same as the panel frame 32. The outer frame 45 of the light frame 43 forms a rectangular frame having an opening section 45a for exposing the backlight main body 42, and the inner frame 46 forms a chassis with the upper side open. Further, by combining the inside edge of the outer frame 45 and the side face of the inner frame 46, the light frame 43 is integrally configured.

Similarly to the outer frame 38 of the panel frame 32, on both of the inside edges of the shorter sides of the outer frame 45, there are provided engaging protrusions not shown, respectively. Further, on both of the outside edges of the shorter sides of the inner frame 46, there are provided engaging recesses not shown, respectively, to be engaged with the engaging protrusions of the outer frame 45, similarly to the inner frame 39 of the panel frame 32. The engaging protrusions and the engaging recesses are arranged to be respectively engaged with each other when the inside edge of the outer frame 45 and the outside edge of the inner frame 46 are overlapped each other, thus the outer frame 45 and the inner frame 46 are reliably fixed to each other and configured integrally.

Further, on one side face of the shorter sides of the outer frame 45, there is provided a notch 45b opening downward. Further, although not shown in the drawings, on one side face of the inner frame 46 corresponding to the one side face of the outer frame 45, there is provided a notch opening upward so as to correspond to the notch 45b of the outer frame 45. It is arranged that a through hole is provided to the side face of the light frame 43 with the notch of the inner frame 46 and the notch 45b of the outer frame 45. The through hole of the light frame 43 is provided with a flexible wiring board 25b connected therethrough to the backlight main body 42.

The liquid crystal panel assembly 31 and the backlight assembly 41 are supported by the support member 51 in the condition in which the backlight assembly 41 is stacked on the rear side of the liquid crystal panel assembly 31. The support member 51 is composed of a substantially rectangular base plate 52 on which the liquid crystal panel assembly 31 and the backlight assembly 41 stacked one another are mounted, a plurality of holding segments 53 extending substantially perpendicular to the base plate 52 and continuously to the three sides thereof, a support section 54 provided continuously to the remaining side of the base plate 52 and for supporting an expanded section 5a of the touch panel 5 described later, and so on.

The base plate 52 of the support member 51 is arranged to have a size compatible with the liquid crystal panel assembly 31 and the backlight assembly 41. Further, by attaching the base plate 52 on a fixing section not shown of the center case 9 with fixing means such as fixing screws, the support member 51 is fixed inside the camera case 2.

In the present embodiment, five holding segments are provided as the plurality of holding segments 53 of the support member 51, and two of them are disposed in the middle of each of the two longer sides of the base plate 52 with an appropriate distance and one is disposed in the middle of a shorter side thereof. These five holding segments 53 are for holding the liquid crystal panel assembly 31 and the backlight assembly 41 by pinching the sides thereof, and are arranged to have lengths equal to the height of the stack of the both assemblies 31, 41.

The support section 54 of the support member 51 is composed of a rising segment 56 extending substantially vertically and continuously from the opposing short side to the one short side provided with the holding segment 53, and an expansion segment 57 expanded in a parallel direction to the base plate 52 continuously to the rising segment 56 and for mounting the expanded section 5a of the touch panel 5. Although not shown in the drawings, the rising segment 56 of the support section 54 is provided with a through hole for allowing a flexible wiring board 25b connected to the backlight main body 42 be inserted therethrough. The expanded segment 57 of the support section 54 has a substantially rectangular shape with a size compatible with the expanded section 5a of the touch panel 5, and the upper surface thereof is arranged to have the same height as that of the upper surface of the liquid crystal panel assembly 31 supported by the support member 51, namely the display surface 4a of the liquid crystal panel 4.

The touch panel 5 has an elongated rectangular planar shape, and is configured including an upper film member 61, a lower film member 62 opposing to the upper film member 61, an upper transparent conductive film 63 and a lower transparent conductive film 64 respectively disposed on the surfaces of the film members 61, 62 opposing to each other, a cushion member 65 intervening between both of the film members 61, 62, a dot spacer 66 for preventing short circuit between the upper transparent conductive film 63 and the lower transparent conductive film 64 while no pressing (touch) operation is performed, a polarization plate 67 disposed on the opposite side of the upper film member 61 to the lower film member 62, and so on as shown in FIG. 4.

As the material of the upper film member 61 and the lower film member 62, polyethylene terephthalate (PET) can be cited, but is not limited thereto. It is obvious that various kinds of materials used for this kind of film member such as polycarbonate (PC), polyethersulfone (PES), orpolyarylate (PAR) can also be used therefor. Further, the upper transparent conductive film 63 and the lower transparent conductive film 64 are members capable of conducting light and electricity, and indium tin oxide (ITO), which is typically used for this kind of touch panel, is applied thereto in the present embodiment.

The upper and lower surfaces of the cushion member 65 are adhered to the upper film member 61 and the lower film member 62 with adhesion means such as an adhesive and an adhesive tape, thus a microscopic gap is formed between the upper and the lower film members 61, 62. As the material of the cushion member 65, an insulating elastic body such as rubber is preferably used. It is obvious, however, that various materials applied to this kind of cushion member such as flexible plastic or other materials can also be used therefor.

A pressing (touch) operation within a predetermined area inner than the cushion member 65 of the touch panel 5 causes strong force applied to the upper film member 61 pivoting around the inside corner section of the cushion member 65. Further, the upper transparent conductive film 63, which is brittle in nature, disposed on the upper film member 61 might be broken. In other words, the touch panel 5 includes a conductive film breakage occurring area A where the upper transparent conductive film 63 might be broken by a pressing operation, as shown in FIG. 4. This conductive film breakage occurring area A is covered by a reinforcing area C of the surface sheet 6 described later.

As shown in FIG. 3, the touch panel 5 is arranged to have a longer sides longer than the liquid crystal panel assembly 31, thus one of the shorter sides thereof protrudes from the outside edge of the liquid crystal panel assembly 31 to form the expanded section 5a. Further, the expanded section 5a of the touch panel 5 is provided with a plurality of input sections. The plurality of input sections is a switch mechanism utilizing the touch panel function, and it is arranged that various inputs to the digital still camera 1 are performed in response to a pressing operation on the switch mechanism.

As the plurality of input sections of the expanded section 5a, there are provided a zoom input section 68a for performing a zoom operation, a menu input section 68b for selecting various menus, and a display switching input section 68c for switching the screen display. These input sections 68a through 68c face an input section operation area D of the surface sheet 6 described later. Further, as another example of the plurality of input sections, there are cited a direction operation input section for moving a cursor or the like for selecting items from a menu, a screen operation input section for performing switching of the screen sizes or deletion of the screen, and so on.

As shown in FIG. 4, the touch panel 5 is fixed by bonding to the display surface 4a of the liquid crystal panel 4 and the expanded segment 57 of the support member 51 with an adhesive 69. The adhesive 69 is liquid-tightly filled in at least between the touch panel 5 and the display surface 4a of the liquid crystal panel 4, thus preventing an air layer from intervening between the touch panel 5 and the display surface 4a of the liquid crystal panel 4 to avoid increase in the optical interfacial reflection.

As shown in FIG. 3 and other drawings, the surface sheet 6 has an elongated rectangular plane shape arranged to have a size compatible with the opening section 23 of the rear case 8, and arranged to seal the opening section 23, and at the same time, to form substantially the same plane with the rear case 8. The surface sheet 6 is formed of a transparent synthetic resin, which can be distorted to the extent that a pressing operation can be performed on the touch panel 5. As the surface sheet 6, an acrylic resin with a thickness arranged in a range of about 0.2 mm through 0.5 mm is preferable. Other synthetic resins such as polycarbonate can also be used with a thickness arranged so that the resin can be distorted to the extent that a pressing operation can be performed on the touch panel 5.

The surface sheet 6 is provided with a display surface operating area B facing the display surface 4a of the liquid crystal panel 4 via the touch panel 5, a reinforcing area C provided to substantially the entire area in a range from the outside edge of the surface sheet 6 to the display surface operating area B and for covering the conductive film breakage occurring area A of the touch panel 5, and an input section operating area D facing each of the input sections 68a through 68c of the touch panel 5.

The display surface operating area B of the surface sheet 6 is an area of the transparent synthetic resin used as the surface sheet without any modifications, through which the display surface 4a of the liquid crystal panel 4 can be viewed, and can be distorted to the extent that the pressing operation can be performed on the touch panel 5. The display surface operating area B can be made a little bit, for example, about 0.3 mm outer from the periphery of the display surface 4a, larger than the display surface 4a of the liquid crystal panel 4. The meaning of 0.3 mm mentioned here is as follows.

This is size setting for preventing an opaque area (the reinforcing area C) extending outside the display surface operating area B of the surface sheet 6 from covering the display surface 4a of the liquid crystal panel 4. By the offset value, the dimensional tolerance of the display surface operating area B in the surface sheet 6, the dimensional tolerance of the display surface 4a in the liquid crystal panel 4, the bonding tolerance between the surface sheet 6 and the liquid crystal panel 4, and so on can be absorbed, thus preventing the reinforcing area C from covering the display surface 4a. Further, outside the display surface of the liquid crystal panel 4, there is provided a so-called black mask formed as an area only for displaying black color. Therefore, even if the outer area of the display surface 4a is positioned adjacent to the frame of the display surface operating area B, which is the transparent area of the surface sheet 6 due to the bonding variation by the bonding tolerance described above, the area looks pure black. Thus, it is arranged that the inside of the camera case 2 cannot be seen from the area adjacent to the frame of the display surface operating area B.

The reinforcing area C is formed by executing a serigraph 71 showing a specific example of coating on an opposite surface of the surface sheet 6 to the touch panel 5. Therefore, the reinforcing area C becomes an opaque layer, which blocks the light visible to the human, and it is arranged that the inside of the camera case 2 cannot be seen through the reinforcing area C. Thus, the reinforcing area C covers the conductive film breakage occurring area A, and at the same time, clarifies the boundary with the display surface operating area B.

As the coating material for the serigraph 71, a coating material for enhancing rigidity is used. This is for enhancing rigidity of the reinforcing area C to be higher than that of other areas, thus improving the resistance of the reinforcing area C against the pressing force applied from the outside. In other words, the reinforcing area C is arranged not to be distorted to the extent that the pressing operation is performed on the touch panel 5 beneath the reinforcing area C. Thus, even if the pressure is applied to the reinforcing area C, the upper transparent conductive film 63 in the conductive film breakage occurring area A can surely be prevented from being broken. It should be noted that as the coating material for enhancing rigidity, a resin coating materials with high rigidity (e.g., resin paints containing metal) can be cited, but these are not limitations, and aluminum, silver, or the like can also be used. Further, it is also possible to arrange the color of the coating material to be the same as the camera case 2 to show as if the reinforcing area C is a part of the camera case 2.

Although in the present embodiment the reinforcing area C is formed by coating the coating material for enhancing the rigidity on the surface sheet 6, the formation of the reinforcing area C is not limited thereto. For example, the reinforcing area C can be formed by adhering a material with high rigidity such as a metal foil, hardened plastic, or the like to the surface sheet 6, or performing a plating process thereon.

The input section operating area D is composed of a zoom input operating area D1 facing a zoom input section 68a provided to the expanded section 5a of the touch panel 5, a menu input section operating area D2 facing the menu input section 68b, and a display switching input section operating area D3 facing the display switching input section 68c. Each of the input section operating areas D1 through D3 is, as is the case with the display surface operating area B, formed of the transparent synthetic resin without any modifications, and can be distorted to the extent that pressing operations can be executed on each of the input sections 68a through 68c of the touch panel 5.

The input section operating areas D1 through D3 of the surface sheet 6 and the respective input sections 68a through 68c provided to the expanded section 5a of the touch panel 5 form various kinds of operation switches such as the menu operation switch or the display selection switch. These operation switches are provided instead of typically used mechanical tact switches, thereby reducing the number of components in comparison with the case of using the tact switches. Further, the face of the camera case 2 on which the liquid crystal panel 4 is disposed can be made as a single plane throughout the entire surface, thus the appearance of the whole digital still camera 1 can be improved.

Further, it is preferable that in order for making the user recognize that the various kinds of operation switches are formed by the respective input section operating areas D1 through D3 and respective input sections 68a through 68c, the surface of the input section operating areas D1 through D3 facing the touch panel is provided with marks by printing or coating with different color from the color of the reinforcing area C for identification. As the printing or the coating in this case, hot stamp or serigraph, as is the case with the reinforcing area C can be cited. It should be noted that as the coating material of the coating provided to the input section operating areas D1 through D3, a material with low rigidity is used to arrange that the input section operating areas D1 through D3 can be distorted to the extent that pressing operations can be performed on each of input sections 68a through 68c.

As shown in FIG. 4, the surface sheet 6 is fixed to a sheet fixing section 23a provided on the periphery of the opening section 23 of the rear case 8 and the opposite surface of the touch panel 5 to the liquid crystal panel 4 with an adhesive 72. This adhesive 72 is filled in at least between the surface sheet 6 and the touch panel 5 in a liquid-tight manner to prevent the air layer from intervening between the surface sheet 6 and the touch panel 5, thereby preventing increase in the optical interfacial reflection.

According to the digital still camera 1 provided with such a configuration, shooting can be performed as follows, for example. Firstly, the digital still camera 1 is powered on by pushing the power button 15. Then, the still image mode is selected by the mode selection switch 21. Then, the menu operation switch composed of the menu input section 68b and the menu input section operating area D2 is pushed. Thus, the selection menu for performing settings of shutter speed, aperture, exposure, and so on is displayed on the display surface 4a of the liquid crystal panel 4.

Subsequently, the settings of shutter speed, aperture, exposure, and so on are performed by pressing the selection menu displayed on the display surface 4a of the liquid crystal panel 4. Specifically, the pressing operation is performed on the touch panel 5 overlapped on the display surface 4a of the liquid crystal panel 4 by pressing the display surface operating area B of the surface sheet 6 facing the display surface 4a of the liquid crystal panel 4, thus inputting settings of the shutter speed and so on.

In this case, since the display surface operating area B of the surface sheet 6 is arranged to be distorted to the extent that the pressing operation can be performed on the touch panel 5, the pressing operation can reliably be performed on the touch panel 5, thus the settings of the shutter speed and so on can be input. Further, the reinforcing area C of the display panel 6, which is increased in resistance against the pressing force applied from the outside by providing the serigraph 71, is not distorted to the extent that the pressing operation is performed on the touch panel 5 beneath the reinforcing area C. Thus, the concentrated stress can be prevented from acting on the conductive film breakage occurring area A covered by the reinforcing area C, thereby eliminating the concern that the upper transparent conductive film 63 of the touch panel 5 might be broken.

After finishing the settings of the shutter speed and so on, an image of the subject acquired by the lens body frame 3 is displayed on the display surface 4a of the liquid crystal panel 4. After then, by pushing the shutter button, a still image can be shot.

FIG. 5 is a cross-sectional explanatory view for explaining a second embodiment of the display device equipped with a touch panel according to the invention. The second embodiment has the support member formed integrally with the rear case, and has the only difference from the first embodiment in the support member 81. Therefore, only the support member 81 will be explained here, and the portions common to the first embodiment are denoted with the same reference numerals, and duplicated explanations will be omitted.

As is the case with the support member 51 of the first embodiment, the support member 81 is provided with a base plate 82, a plurality of holding segments 83, and a support section 84. Further, an opposite end portion of each of the plurality of holding segments 83 to the base plate 82 and an opposite end portion of the support section 84 to the base plate 82 are formed continuously to a sheet fixing section 85a of the rear case 85. In this case, the operation of fixing the support member 81 to the center case 9 can be eliminated, thus making it possible to reduce man-hour.

FIG. 6 is a cross-sectional explanatory view for explaining a third embodiment of the display device equipped with a touch panel according to the invention. The digital still camera 90 of the second embodiment has a configuration of closing the opening section of the rear case with the surface sheet having a shape with protruding periphery, and the differences of the third embodiment from the first embodiment are the shapes of the surface sheet 91 and the rear case 92. Therefore, only the surface sheet 91 and the rear case 92 will be explained here, and the portions common to the first embodiment are denoted with the same reference numerals, and duplicated explanations will be omitted.

As shown in FIG. 6, the surface sheet 91 is formed to have a vessel-like shape with the protruding periphery. The rear case 92 to which the surface sheet 91 is fixed is provided with a sheet fixing section 92a on the side face thereof. Further, the surface sheet 91 is fixed to the sheet fixing section 92a of the rear case 92 and the touch panel 5 with the adhesive 72. By adopting such a configuration of fixing the surface sheet 91 by the side face of the rear case 92, it becomes possible to make the joint between the rear case 92 and the surface sheet 91 invisible from the surface of the digital still camera 90, to which the opening section 23 is provided, thus further improving the visual quality of the appearance.

Although the first through third embodiments described above have a configuration of using the liquid crystal panel as a specific example of the display panel, the display panel according to the invention is not limited thereto, but an organic EL panel or the like can also be used as the display panel. It should be noted that the backlight assembly 41 disposed behind the liquid crystal panel 4 can be eliminated if the organic EL panel is used.

Further, although in the first through third embodiments described above, the various kinds of operation switches are composed of the input section 68a through 68c of the touch panel 5 and the input section operating areas D1 through D3 of the surface sheet 6, thereby disposing the various kinds of operation switches on an area other than the display surface 4a of the liquid crystal panel 4, the various kinds of operation switches can be disposed on an area overlapping the display surface 4a of the liquid crystal panel 4. In this case, the input sections 68a through 68c are disposed on appropriate positions in the touch panel 5 facing the display surface 4a of the liquid crystal panel 4, for example, on the positions facing the peripheral section of the display surface 4a, and further the display surface operating area B of the surface sheet 6 is provided with printing or the like indicating the positions of the input sections 68a through 68c. Thus, the size of the liquid crystal panel 4 can be increased, and the display surface 4a thereof can be enlarged.

As explained hereinabove, according to the imaging apparatus showing a specific example of a display device equipped with a touch panel according to the invention, one surface of the device chassis through which the display panel provided with the touch panel is accessible can be formed as a plane, thus improving the visual quality of the whole apparatus, and preventing the dirtiness with the foreign particles such as dust accumulated in the one surface of the device chassis. Moreover, by providing the reinforcing area in the surface sheet, the concentrated stress caused by the pressing operation can be prevented from locally acting on the touch panel, thus the breakage of the transparent conductive film of the touch panel can be prevented.

Further, since the touch panel is provided with an expanded section protruding outward from the periphery of the display panel, and the expanded section is provided with various kinds of input sections, thus forming the operation switches for performing various kinds of inputs by pressing (touch) operations, the surface of the device through which the display panel can be accessed can be made as a single plane throughout the entire surface, thus the visual quality of the whole device can be made extremely preferable. Still further, since the a support section for supporting the expanded section of the touch panel is provided, the touch panel can be prevented from being distorted by its own weight or the pressing force applied to the expanded section, thus the switch mechanism provided on the expanded section can reliably be operated.

The invention is not limited to the embodiments described hereinabove and shown in the drawings, but can be put into practice in a variously modified manner within the scope of the invention. For example, although the examples applying the digital still camera showing a specific example of an imaging apparatus as a display device equipped with a touch panel are explained in the embodiments, the invention can be applied not only to imaging apparatuses such as digital video cameras, or camera-equipped personal computers, but also to disk recording/reproducing devices, cell-phones, electronic dictionaries, portable game machines, mobile terminal devices, or other display devices equipped with touch panels.

It should be understood by those skilled in the art that various modifications, combinations, sub-combinations and alterations may occur depending on design requirements and other factors insofar as they are within the scope of the appended claims or the equivalents thereof.

The invention claimed is:

1. A display device equipped with a touch panel, the display device comprising:
   a device chassis provided with an opening section;
   a planar display panel including an upper polarization plate, an upper glass plate, a liquid crystal layer, a lower glass plate, and a lower polarization plate and having a display surface disposed accessible through the opening section and formed of a surface of the upper polarization plate, the upper and lower polarization plates being smaller than the upper and lower glass plates;
   a continuous surface sheet for covering the touch panel on the opposite side to the display panel, and closing the opening section to form a substantially the same surface with the device chassis, wherein the touch panel is provided with an expanded section protruding laterally from an outer edge of the display panel, the expanded section is provided with one or more input sections each having a corresponding operation switch, and a reinforcing area for improving resistance against pressing force applied from the outside is provided in a predetermined portion of the surface sheet, the reinforcing area includes one or more operating areas that are disposed atop the one or more input sections, and the continuous surface sheet coincides with the reinforcing area and is distortable at the one or more input sections for operating the corresponding operation switch;

a support member affixed to an inside part of the device chassis and including a base section for supporting the display panel and a plurality of holding members formed continuously with and disposed along at least two edges of the base section and configured to secure the display panel;

a planar light source means for supplying the display panel with light and having a substantially same area as the display panel, the light source means being disposed between the support member and the display panel and being secured by the holding members of the support member;

a first inner frame member for framing an inner surface and part of a side surface of the display panel;

a first outer frame member for framing an outer surface and another part of a side surface of the display panel, an outer edge of the first inner frame member and an outer edge of the first outer frame member engaging each other along the side surface of the display panel;

a first flexible wiring board electrically connected to the display panel and extending through a through hole formed of a notch formed in the outer edge of the first inner frame member and a notch formed in the outer edge of the first inner frame member;

a second inner frame member for framing an inner surface and part of a side surface of the light source means;

a second outer frame member for framing an outer surface and another part of a side surface of the light source means, an outer edge of the second inner frame member and an outer edge of the second outer frame member engaging each other along the side surface of the light source means; and a second flexible wiring board electrically connected to the light source means and extending through a through hole formed of a notch formed in the outer edge of the second inner frame member and a notch formed in the outer edge of the second outer frame member.

2. The display device equipped with a touch panel according to claim 1, wherein the reinforcing area is formed integrally with the surface sheet, continuously along the periphery of the opening section, and in a range formed with a predetermined width from an outer edge of the opening section.

3. The display device equipped with a touch panel according to claim 1, wherein the reinforcing area is formed as a covering to hide so that the inside of the device chassis is hidden.

4. The display device equipped with a touch panel according to claim 1, wherein the reinforcing area is formed by coating the surface sheet with a coating material for enhancing rigidity.

5. The display device equipped with a touch panel according to claim 1, wherein the reinforcing area is formed by adhering a material for enhancing rigidity on the surface sheet.

6. The display device equipped with a touch panel according to claim 1, wherein the support member includes a support section for supporting the expanded section.

7. The display device equipped with a touch panel according to claim 6, wherein the support section is formed by folding a part of the support member for supporting the display panel.

8. The display device equipped with a touch panel according to claim 6, wherein an end portion of at least one of the holding members and an end portion of the support section are each formed continuously with the device chassis.

9. The display device equipped with a touch panel according to claim 1, wherein the reinforcing area is formed of a resin containing a metal.

10. The display device equipped with a touch panel according to claim 1, wherein the reinforcing area is formed of a metal foil.

11. The display device equipped with a touch panel according to claim 1, wherein the one or more input sections includes one or more of a zoom input section, a menu input section, and a display switching input section.

12. A display device equipped with a touch panel, the display device comprising:

a device chassis provided with an opening section;

a display panel including an upper polarization plate, an upper glass plate, a liquid crystal layer, a lower glass plate, and a lower polarization plate and having a display surface disposed accessible through the opening section and formed of a surface of the upper polarization plate, the upper and lower polarization plates being smaller than the upper and lower glass plates;

a continuous surface sheet for covering the touch panel on the opposite side to the display panel, and closing the opening section to form a substantially the same surface with the device chassis, wherein the touch panel is provided with an expanded section protruding laterally from an outer edge of the display panel, the expanded section is provided with one or more input sections each having a corresponding operation switch, a reinforcing area for improving resistance against pressing force applied from the outside is provided in a predetermined portion of the surface sheet, the reinforcing area includes one or more operating areas that are disposed atop the one or more input sections, and the continuous surface sheet coincides with the reinforcing area and is distortable at the one or more input sections for operating the corresponding operation switch, and wherein the reinforcing area is formed by coating the surface sheet with a coating material for enhancing rigidity and is formed as an opaque layer for covering to hide so that the inside of the device chassis becomes invisible;

a planar light source means for supplying the display panel with light and having a substantially same area as the display panel;

a first inner frame member for framing an inner surface and part of a side surface of the display panel;

a first outer frame member for framing an outer surface and another part of a side surface of the display panel, an outer edge of the first inner frame member and an outer edge of the first outer frame member engaging each other along the side surface of the display panel;

a first flexible wiring board electrically connected to the display panel and extending through a through hole formed of a notch formed in the outer edge of the first inner frame member and a notch formed in the outer edge of the first inner frame member;

a second inner frame member for framing an inner surface and part of a side surface of the light source means;

a second outer frame member for framing an outer surface and another part of a side surface of the light source means, an outer edge of the second inner frame member and an outer edge of the second outer frame member engaging each other along the side surface of the light source means; and a second flexible wiring board electrically connected to the light source means and extending through a through hole formed of a notch formed in the outer edge of the second inner frame member and a notch formed in the outer edge of the second outer frame member.

13. The display device equipped with a touch panel according to claim 12, wherein the reinforcing area is formed by adhering a material.

14. The display device equipped with a touch panel according to claim 12, wherein a support section for supporting the expanded section is provided inside the device chassis.

15. The display device equipped with a touch panel according to claim 12, wherein the reinforcing area is formed of a resin containing a metal.

16. The display device equipped with a touch panel according to claim 12, wherein the reinforcing area is formed of a metal foil.

* * * * *